US006486309B1

(12) United States Patent
Gerber et al.

(10) Patent No.: US 6,486,309 B1
(45) Date of Patent: Nov. 26, 2002

(54) METHOD OF DETECTING SEQUENCE VARIATIONS IN MACROMOLECULES BY THERMAL GRADIANT

(75) Inventors: Reinhold E. Gerber, Berkeley, CA (US); Richard G. Hatch, Berkeley, CA (US)

(73) Assignee: Varian, Inc., Palo Alto, CA (US)

( * ) Notice: Subject to any disclaimer, the term of this patent is extended or adjusted under 35 U.S.C. 154(b) by 0 days.

(21) Appl. No.: 09/921,267

(22) Filed: Aug. 1, 2001

(51) Int. Cl.$^7$ ............................................... C12N 15/10
(52) U.S. Cl. ...................................... 536/23.1; 210/656
(58) Field of Search .......................... 536/23.1; 210/656

(56) References Cited

U.S. PATENT DOCUMENTS

| 5,795,976 A | 8/1998 | Oefner et al. | |
| 2002/0042060 A1 * | 4/2002 | Races et al. | 435/6 |

OTHER PUBLICATIONS

Article by Djordjevic, et al. entitled "HPLC Separation of Oligo nucleotides in Isocratic and Temperature–Programming Mode", published in Anal. Chem. 1998, 70, pp. 1921–1925.
Article by Goss, et al. entitled "High–Performance Affinity Chromatography of DNA", published in Journal of Chromatography, 508 (1990), pp. 279–287.
Article by Guthridge, et al. entitled "High–Performance Liquid Chromatography of Amino Acids, Peptides, Proteins and Polynucleotides", published in the Journal of Chromatography, 476 (1989), pp. 445–453.
Article by Masson, et al. entitled "High–Performance Affinity Chromatography of DNA", published in Journal of Chromatography, 600 (1992), pp. 221–228.
Article by Goss, et al., entitled "High–Performance Affinity Chromatography of Messenger RNA", published in Journal of Chromatography, 588 (1991), pp. 157–164.
Article by Paul Molander, et al., entitled "Temperature–Programmed Packed Capillary Liquid Chromatography Separation with Large Volume On–Column Focusing of Retinyl Esters", published in J. High Resol. Chromatogr. 1999, 22, (9), pp. 490–494.

Article by Djordjevic, et al., entitled "High Temperature and Temperature Programming in High–Performance Liquid Chromatography: Instrumental Considerations", published in J. Microcolumn Separation, 11(6), (1999), pp. 403–413.
Article by Chen, et al., entitled "Temperature Programming and Gradient Elution in Reversed–Phase Chromatography wiht Packed Capillary Columns", published in Journal of Chromatography A, 788 (1997), pp. 51–61.
Article by Houdiere, et al., entitled "Combination of Column Temperature Gradient and Mobile Phase Flow Gradient in Microcolumn and Capill ary Column High–Performance Liquid Chromatography", published in Anal. Chem. 1997, vol. 69, pp. 2589–2593.
Article by Trones, et al., entitled "High Temperature Liquid Chromatography on Packed Capillary Columns with Nonaqueous Mobile Phases", published in J. Microcolumn Separations, vol. 7 No. 5, 1995, pp. 505–512.
Article by Moore et al., entitled "Axial Thermal Gradient Microbore Liquid Chromatography by Flow Programming", published in Anal. Chem., 1993, 65, pp. 2663–2670.
Article by Bowermaster, et al., entitled "Temperature Programmed Microb ore HPLC—Part 1", published in Journal of Chromatographic Science, vol. 22, Apr. 1984, pp. 165–170.
Article by Bowermaster, et al., entitled "Microbore High –Performance Liquid Chromatographic Columns: Speed, Efficiency, Sensitivity and Temperatute Programming", published in Journal of Chromatography, 279 (1983), pp. 431–438.
Article by Takeuchi, et al., entitled "Role of Column Temperature in Micro High Performance Liquid Chromatography", published in Journal of HRC & CC, vol. 4, Jun. 1981, pp. 300–302.

* cited by examiner

*Primary Examiner*—James Ketter

(57) ABSTRACT

The present invention describes a method for separating macromolecules, particularly heteroduplex from homoduplex DNA molecules. The macromolecules undergo a temperature sensitive structural denaturation which, when it occurs, results in a difference in the mobilities of the denatured components on a solid support. A polar to nonpolar solvent gradient or modified solid support particular to each sample is not required, since the difference in mobility is achieved on conventional solid supports using a single mobile phase composition.

14 Claims, 3 Drawing Sheets

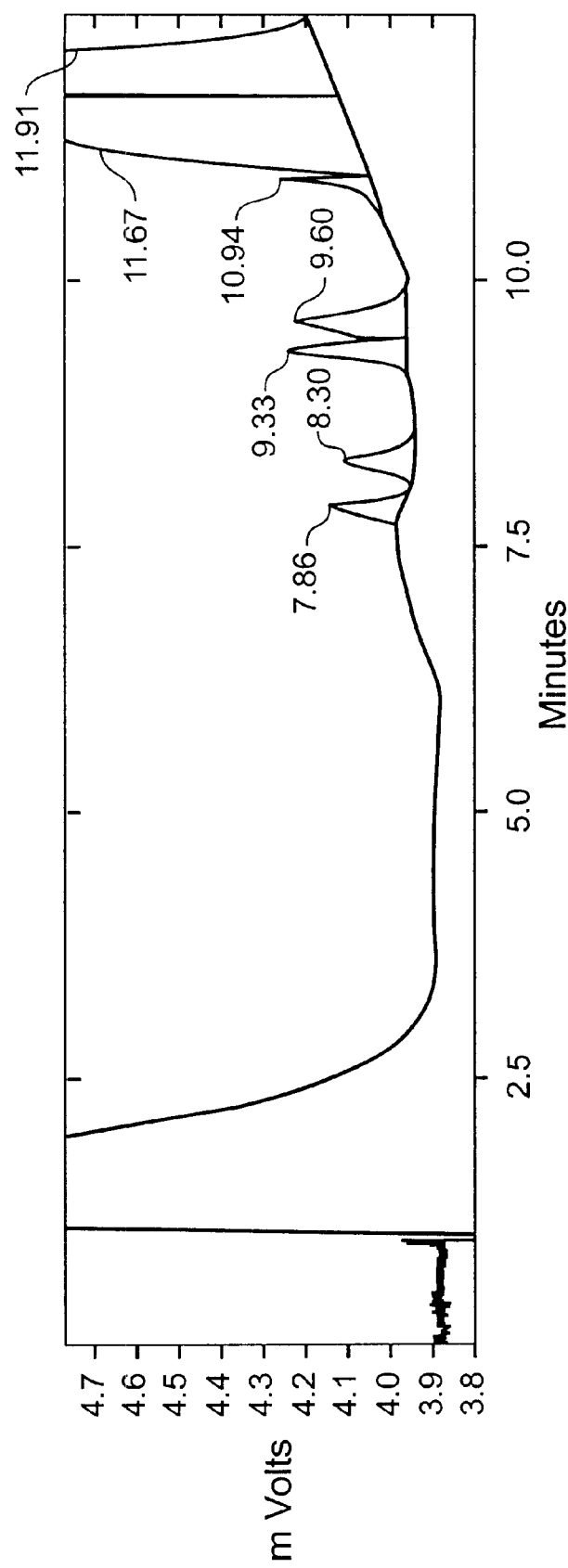
FIG._1

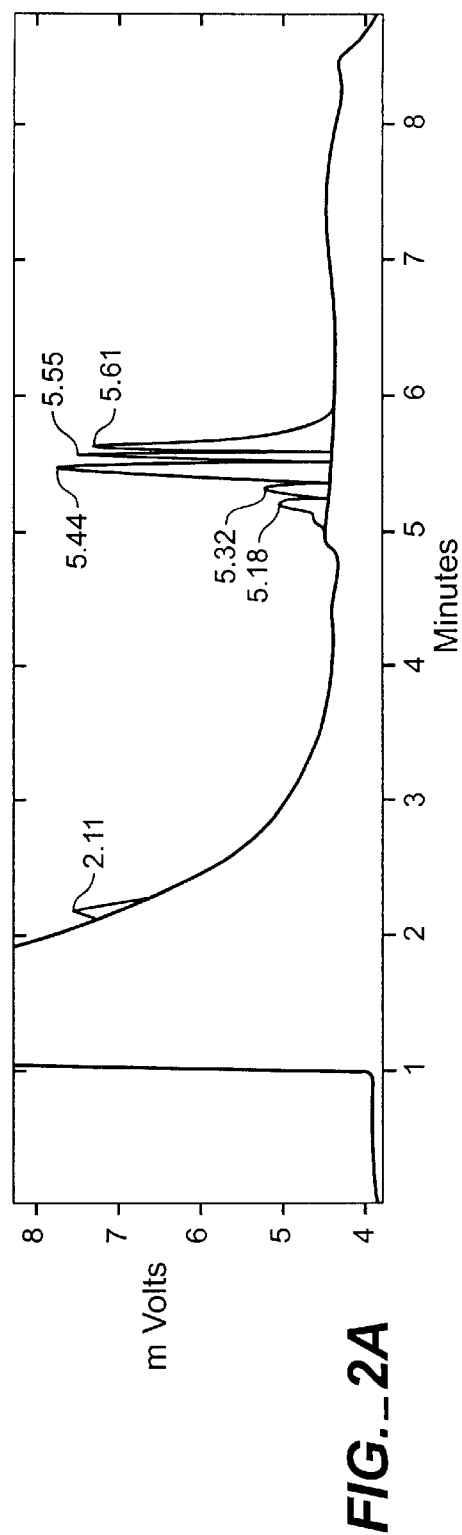
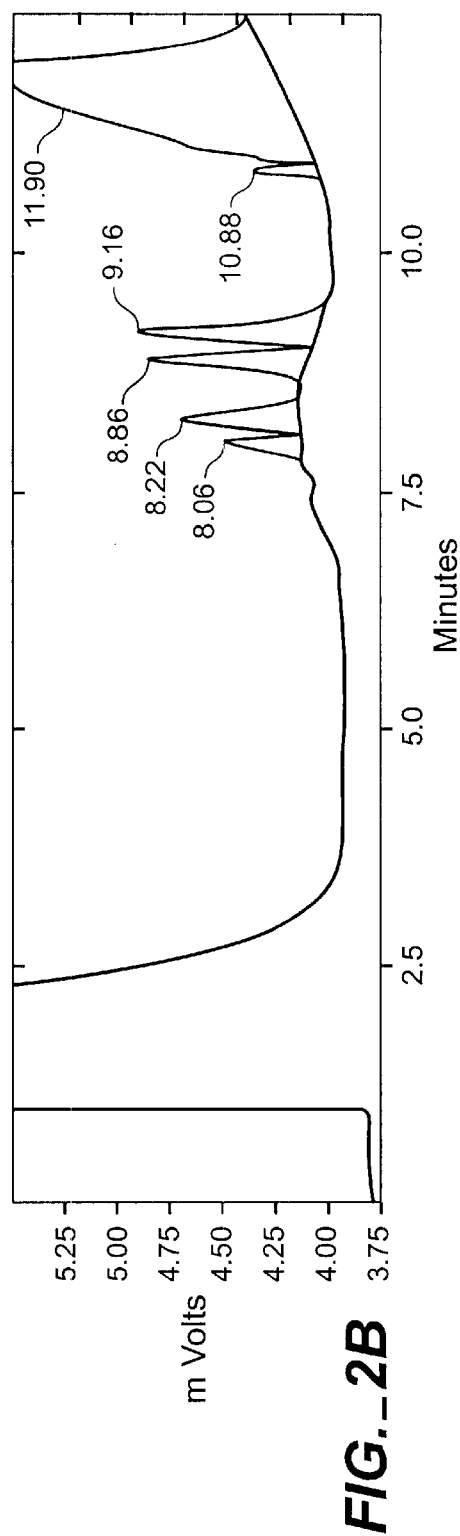
FIG._2A
FIG._2B

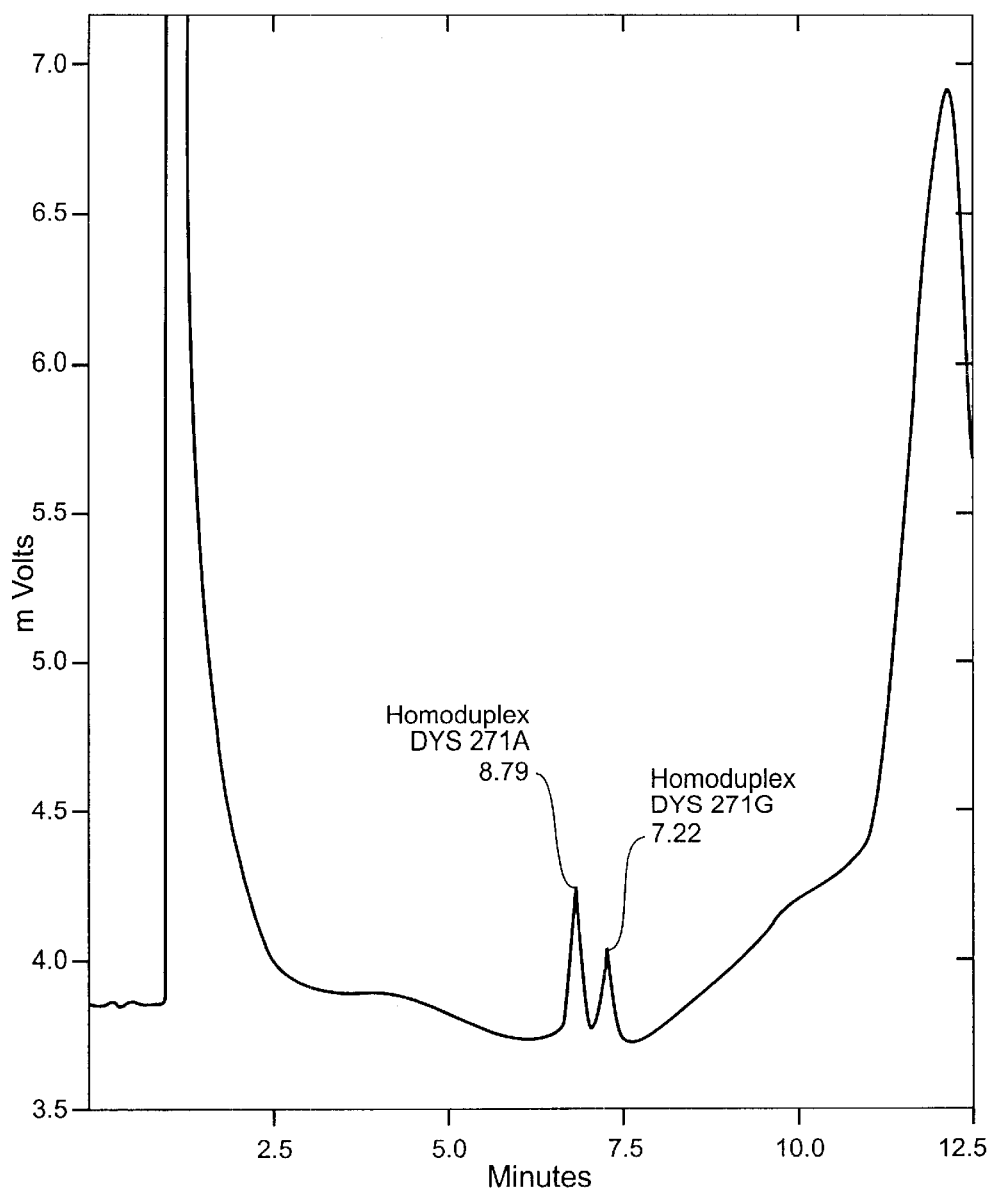
FIG._3

METHOD OF DETECTING SEQUENCE VARIATIONS IN MACROMOLECULES BY THERMAL GRADIANT

FIELD OF THE INVENTION

The present application is directed to a method of separating and detecting small sequence variations in macromolecules, such a polynucleotides having a single nucleotide alteration in a DNA sequence.

BACKGROUND OF THE INVENTION

Several prior methods have been available for the detection of small changes or polymorphisms (PMs) in polynucleotide sequences, such as a single nucleotide mutation within a double stranded DNA (dsDNA) molecule. Restriction fragment length polymorphism (RFLP) analysis is one method of polymorphism detection but it can only detect those polymorphisms which contain an altered enzymatic reaction site. It is not suitable for the high sensitivity detection of unknown PMs.

By other methods, short sequences of complementary polynucleotides can be used as hybridization probes which allow one to distinguish specific known complementary sequences from sequences not complementary to the probe. However, these methods cannot be used to detect unknown polymorphisms in unknown locations within a polynucleotide sequence without first creating all possible combinatorial sequences. The use of combinatorial methods greatly increases the complexity of the detection of polymorphisms, since highly specialized chemical processes and costly instrumentation are required.

Some effective prior methods used to detect small changes in polynucleotide species such as DNA sequences have been based on the differing mobilities of the variant species, or their cleavage products in electrophoretic separations. These techniques may be used for separation of variant species of DNA. Single-stranded conformation polymorphism (SSCP) analysis relies on changes in the mobility of denatured DNA molecules due to the formation of secondary structures during electrophoresis. This technique requires analyzing a sample under several conditions to achieve optimum sensitivity, but only about 70% of polymorphisms can be detected this way.

Other techniques rely on detection of a heteroduplex formation in dsDNA. Denaturing gradient gel electrophoresis (DGGE) and temperature gradient gel electrophoresis (TGGE) have much greater sensitivity than SSCP, but typically require that the sample contain so called "GC clamps" to produce reliable detection under chemical or thermal denaturing conditions. The incorporation of these GC clamps into the sample molecules increases the complexity and cost of sample preparation.

In other techniques the heteroduplex is detected by chemical or enzymatic cleavage at the polymorphism, followed by electrophoretic separation of the cleavage products. The chemical methods often require highly toxic reagents, and multiple reaction steps. The enzymatic methods typically require exotic proprietary enzymes and are difficult to reproducibly perform.

For the electrophoretic methods described above, slab gel electrophoresis is the most commonly used. Slab gel electrophoreis suffers from the drawback of being relatively slow, and attaining poor detection and quantitation of the samples. It is also quite labor intensive. Capillary electrophoresis is faster and not as labor intensive as slab gel electrophoresis, but reproducibility and quantitation are generally poor due to variation in capillary performance. Finally, all of the electrophoretic methods use polymeric matrices which complicate recovery of the identified variant species as the subsequent analysis, often performed by mass spectrometry.

More recently, an improved method of polymorphism detection utilizes liquid chromatography under denaturing conditions to detect polymorphisms in heteroduplex species dsDNA species. See U.S. Pat. No. 5,795,976. The technique, denaturating high performance liquid chromatography (DHPLC), requires that the sample be separated using optimized gradient reversed-phased liquid chromatography methods. Both the separation solvent composition gradient and the operating temperatures must be optimized since they are highly specific to a particular DNA fragment sequence. Homoduplex species can be distinguished from heteroduplex species by the altered chromatographic retention under optimized conditions.

Temperature gradient programming in liquid chromatography has been known but only to utilize the general effect of temperature in reducing retention, thereby enhancing elution from a column. For example, Djordjevic, et al. Anal. Chem., 70 (9)1921–25 (1998) disclose the analysis of oligonucleotides using a temperature programmed ion pair reversed phased method. The molecules are, however, single stranded nucleic acids. They are separated by the reduction of retention that occurs with increasing temperature. There is no showing of a conformational change induced by increasing the temperature nor detection of the extent of hybridization, since the samples are single stranded.

Jarrett, et al. J. Chrom., 508, 279–87 (1990) disclose the preparation of a chromatography affinity phase to which an oligothymidylic acid (DT)18 is covalently bonded. The affinity phase is used to separate single stranded oligonucleotides by temperature gradient elution. The sample is retained on the column by on-column hybridization, then by increasing the temperature there is successive displacement of longer complementary probes from the stationary phase based upon the affinity of the complementary pair DNA strands. The disadvantage of the technique is that it requires the synthesis of a unique phase for each target sample.

The present invention provides a method for separating macromolecules which does not suffer from such disadvantages and which is particularly useful for separating single nucleotide variants of DNA. The invention does not require chemical or enzymatic cleavage reactions, modification of sample DNA sequences with GC clamps, preparation of combinatorial probes, or extensive optimization of liquid chromatography gradient conditions and temperatures. The invention provides an easily automated high speed sensitive method which allows recovery of the analyzed dsDNA sample free from polymeric contaminants.

SUMMARY OF THE INVENTION

A liquid chromatographic method is provided for separating macromolecules such as polynucleotides which undergo a temperature sensitive structural denaturation by means of a temporal or spatial thermal gradient to produce differential chromatographic mobility of polynucleotide molecules on interaction with a stationary phase. The method is particularly adapted for the separation of variant DNA polymorphisms. A mixture of polynucleotide molecules is applied in a mobile phase to a stationary reversed phased support. The polynucleotide molecules remain undenatured or can be at least partially denatured. The mixture is then eluted with a mobile phase while exposing the polynucleotides to a temperature gradient effective to at least partially denature the polynucleotides, which results in separation. This temperature gradient may be formed either as a temporal temperature gradient applied to the entire stationary phase or as a spatial temperature gradient in the stationary phase through which the polynucleotides migrate.

DESCRIPTION OF DRAWINGS

FIG. 1 is a chromatogram using the temperature gradient liquid chromatography of the invention to separate the sample described in Example 1.

FIG. 2A is a chromatogram of a DHPLC separation of the sample described in Example 2.

FIG. 2B is a chromatogram of the sample described in Example 2 using temperature gradient liquid chromatography.

FIG. 3 is a chromatogram of the separation of the sample described in example 3 using temperature gradient liquid chromatography.

DETAILED DESCRIPTION OF THE INVENTION

In the present application the term polynucleotide refers to any polynucleic acid molecule such as DNA or RNA whether single stranded or double stranded, which has a length of nucleotide bases of two or more. A homoduplex refers to a double stranded length of polynucleotide in which the two strands are entirely complementary along their length. A heteroduplex is a double stranded polynucleotide in which the two strands are partially complementary but there are mismatches which occur due to the presence of a base pair mismatch and/or insertion or deletion at one or more sites in either of the strands.

High performance liquid chromatography (HPLC) refers to a technique for partitioning the components of a sample between a liquid moving or mobile phase and a solid stationary phase. Reverse phase support refers to any stationary support for use in HPLC which is less polar than the starting mobile phase. Ion pair (IP) chromatography refers to any chromatographic method for separating samples in which at least some of the sample components contain functional groups which are ionized or ionizable. Typically, this type of chromatography is carried out with a reverse phase in the presence of a ion-pairing agent. An ion-pairing agent is an agent which interacts with the ionized or the ionizable groups on the sample molecule to improve resolution in a separation. The degree of hydrophobicity and concentration of an ion-pairing agent depends on the number and types of charged sites in the sample. Ion-pairing reverse-phased high performance liquid chromatography is a type high performance liquid chromatography in which the solid support is a reverse-phase support and the mobile phase contains an ion pairing agent. The stationary phase in reversed phase ion pairing chromatography is typically contained in a column equipped with fluid connections at the inlet and outlet ends. The invention may be performed typically using such columns, however, the stationary phase may also take the form of capillary tubing containing a stationary phase, or any other spatial arrangement allowing for the application of mobile phase and sample, such as thin layer chromatography. The term column incorporates all such spatial arrangements the of stationary phase. The preferred arrangement is a liquid chromatography column. Besides columns of the usual dimensions for analytical HPLC, the invention may be performed using capillary columns or microfabricated devices such as a substrate with grooves containing a stationary phase fabricated by techniques known to those skilled in the art of semiconductor device manufacturing.

Base pair mismatches typically refer to a single base pair mismatch flanked by matched base pairs. However, this may also refer to base pair mismatches in a series of mismatched based pairs flanked by matched based pairs. Insertions or deletions in two otherwise complementary oligonucleotide strands result in heteroduplexes where one strand contains the greater number of nucleotides at an internal site than the second strand and where the extra nucleotides are flanked by paired complementary sequences. A heteroduplex molecule that is at least partially denatured in a set of conditions refers to a molecule in which some of the complementary base pairs of the duplex are not hydrogen bond paired. In accordance with the present invention, the separation techniques are applied to macromolecules, including DNA duplexes, which undergo a temperature-sensitive structural denaturation. The macromolecular materials which may be separated according to the present invention include those which undergo a temperature sensitive denaturation or conformational change that causes a retention shift to differentially elute the sample from a column from other materials. Thus, the present invention may be utilized to separate double stranded DNA samples which contain one or more mismatches (the heteroduplex) from the same or similarly sized double-stranded DNA sample in which there are no mismatches (homoduplex). Furthermore, separation may be accomplished if mismatches occur at different sectors of a duplex or if different duplexes contain different mismatches, as long as the respective mismatches result in a temperature dependent conformational change which differs between non-identical duplexes. The temperature gradient may be applied by either increasing the temperature of the entire column after the sample has been applied (temporal gradient), or by heating/cooling different sectors of the column so that there is an axial or linear temperature gradient along the column (spatial gradient). Since typically one strand of the homoduplex or heteroduplex will be a probe, the probes may be labeled with a fluorescent or other tag, to enhance sensitivity of identification and separation. Application of the technique of ion pair reverse phase liquid chromatography is preferred.

The stationary phase for use in a reverse phase liquid chromatography system may be selected from those reverse phase solid supports available in the art. These materials are typically hydrophobic alkylated inorganic bases such as silica, zirconia, or alumina, and polymeric phases such as polyacrylamide, polystyrene and copolymers of styrene, such as styrene-divinyl copolymers, polymethacrylates, and methacrylate copolymers. Typically the stationary phase is less polar than the starting mobile phase and selection of a particular stationary phase may vary depending upon the nature of the sample and experimental parameters.

Typically, the stationary phase is an alkylated material, such as an alkylated polystyrene divinyl benzene copolymer. A polystyrene-divinyl benzene copolymer may be alkylated with alkyl groups containing up to about 18 carbon atoms. The alkylated stationary phase may contain functional groups for surface modification, depending upon the nature of the sample to be separated and operational parameters. Alkylation may be accomplished by conventional means such as Friedel-Crafts reaction, or commercially available alkylated reverse-phase supports may be used. The stationary phase typically does not contain pores large enough to allow entrance of the polynucleotide molecules being separated and thus functions as a nonporous support.

The mobile phase composition will vary depending upon the nature of the sample. For ion-pairing reverse phase HPLC any number of conventional systems may be utilized and varied according to the parameters of pH, polar/nonpolar solvent ratio, ion-pairing reagent, counter ion type and concentration, etc., to achieve desired optimal separation. Those of ordinary skill in the art may readily adjust these parameters to determine the mobile phase composition which achieves optimal separation for the sample in question. Ion-pairing agents may comprise part of the mobile system, such as an amine, particularly tertiary amines such as triethylamine, trialkyl ammonium salts of acids, such as triethyl ammonium acetate and quaternary ammonium salts, such as tetrabutylammonium phosphate. Ion pairing agents for use in protein separations include alkanoic acids and perfluoroalkanoic acids. The selection of the type of ion-pairing agent and concentration is within the skill of those of ordinary skill in the art to determine the requirements for achieving optimal separation for the sample in question. Organic solvents which comprise the mobile phase include polar solvents such as methanol, ethanol, 2-propanol, and acetonitrile. The pH of the mobile phase will typically be between about 7 and 9. However, it is preferred that the pH be such that the pH alone will not achieve the denaturation of materials in the sample. It is intended preferably that the denaturation occur substantially entirely by the temperature gradient applied to the sample. The concentration of the mobile phase components is dependent upon the nature of the separation, but it is an advantage of the invention in that the mobile phase composition need not vary from sample to sample, nor be varied during the course of the elution process, as is the case with typical liquid chromatography procedures. Isocratic elution can be used, meaning that the mobile phase is applied to the column at a constant composition. The temperature dependent denaturation of components of the sample will be achieved solely by the temperature. gradient, therefore the solvent system may be constant throughout the elution process. Moreover, the solid phase support need not be modified for a particular sample. Therefore, it is advantageous in that conventional solid supports may be used and a single mobile phase system, invariable throughout the elution process, may be utilized so that the differentiation of mobility on the solid support is determined solely by the achievement of the temperature sensitive denaturation. The use of a single mobile phase system is an advantage as it allows the use of greatly simplified mobile phase delivery systems and is particularly beneficial for separations using capillary or other miniaturized chromatographic techniques, where the creation of suitable solvent gradients is difficult.

The temperature variation for duplex DNA molecules will typically occur within a small temperature range. Therefore, in one embodiment, after the sample is applied to the column, the mobile phase may be passed through the column while the temperature of the entire column is gradually raised. The denatured duplexes have a different mobility and retention on the solid phase from the undenatured duplexes of similar or identical molecular weight, which achieves separation. The temperature gradient may be achieved preferably by applying the sample to the stationary phase under conditions which do not substantially denature components of the sample. Then the sample is eluted with a mobile phase while raising the temperature of the column to accomplish at least a partial denaturation of a component of the sample with results in separation. The temperature gradient ensures that sample molecules will encounter the optimal temperature for separation as they are eluted. In the Examples below, the temperature gradient was two to three times as large as the full denaturation temperature range for the sample molecules. The temporal temperature gradient spanned a range at least six times larger than the temperature range of optimal DHPLC detection. The temporal temperature gradient mode thus ensures the exposure of the sample to the optimal temperature since the differential migration of the sample species will be largest at that temperature and there is no mechanism available in the method to reverse the separation once it occurs. Alternatively, the sample mixture may be applied to the stationary phase under conditions which partially denature components of the sample by selection of pH, ion pair, etc. The sample is eluted with the mobile phase while being exposed to the temperature gradient to affect separation. In some cases, partial denaturation of the sample when first applied to the stationary support may be desirable to achieve better retention of the sample at the top of the column which may ultimately achieve better separation.

In another alternative, the sample may be applied to a column with an axial temperature gradient, for example, such that the inlet end is warmer than the outlet. The mixture cools as it is eluted from the column. In this case, the sample molecules are partially denatured upon injection onto the column and as they migrate down the column they encounter cooler zones where the migration rates decline as renaturation begins for each duplex species present. The decreasing migration rate leads to a focusing effect of the molecules, after which the molecules may be eluted from the column. Alternatively, the inlet temperature may be raised over time while maintaining the axial temperature gradient. This constitutes the use of combined temporal and spatial temperature gradients.

The temperature range over which the partial denaturation of the duplexes occurs may be less than 20° C. typically less than about 10° C. so the range of the temperature within the temperature gradient is not excessively large. Typically the column temperature will be between about 45 to about 70° C. for HPLC chromatography according to the present invention. The optimal initial column temperature and temperature range will depend upon the sequence of the sample to be separated. The exact stationary phase, mobile phase, pH, flow rate and the like, may be determined empirically by those of ordinary skill in the art. The invention may be utilized to detect point mutations in polynucleic acids containing from about 10 up to about 2000 base pairs. The following examples are provided by way of illustration and are not intended to limit the invention in any way.

EXAMPLE 1

A sample containing the 321 bp heteroduplex containing the P218 polymorphism of the FBNI gene, exon 24, was analyzed on an Agilent Eclipse with a reversed phase column stationary phase. All separations were conducting using a mobile phase where Buffer A is 100 mM triethylammonium acetate, pH 7.0 and 0.1 mm EDTA and where Buffer B is identical to A but also contains 25% by volume of acetonitrile. The column was held at 61° C. and eluted with a mobile phase gradient starting with 45% and terminating with 68% B. The sample eluted as four peaks, corresponding to the four duplex species present. In the corresponding temperature gradient liquid chromatography separation using the present invention, the mobile phase composition was fixed at 59% B. The sample was eluted by raising the temperature from 58° C. to 65° C. a rate of 0.7 degrees/min. Again the sample eluted as four peaks, but the resolution was significantly higher. The chromatogram is shown in FIG. 1.

EXAMPLE 2

Using a DHPLC column with a reversed phase stationary phase, a sample containing the 321 bp heteroduplex containing the P832 polymorphism of the FBI gene, exon 24, was eluted at a constant temperature of 61° C. using the mobile phase gradient starting with 45% and terminating with 68% B. The sample separated into four main peaks, shown in FIG. 2A. The smaller peaks are contaminants. The corresponding temperature gradient liquid chromatography experiment was conducted on the same sample where the mobile phase composition was fixed at 59% B and the sample was eluted using a temperature gradient from 58° C. to 67° C. raised at a rate of 0.7 degrees/min. The sample separated into four main peaks with much greater resolution as shown in FIG. 2B.

EXAMPLE 3

A sample containing a synthetic mixture of homoduplexes DYS271 amplicon containing either an A or G base at position 209 was separated using temperature gradient liquid chromatography according to the invention. The column temperature was raised from 53° C. to 65° C. at a rate of 1 degree/min. The mobile phase was 58% acetonitrile in water. The chromatogram in FIG. 3 shows a clean separation of the two homoduplex components which were eluted in less than six minutes.

A particular articular advantage of the present invention is that it is more reliable and secure for obtaining the correct conditions for polymorphism detection. Using the prior method of DHPLC, an optimized temperature must be predetermined to obtain proper detection and to obtain optimal detection sensitivity may require controlling this temperature to as small as a fractional degree range. In conventional DHPLC, if the optimal temperature is missed, the efficiency of detection may be poor.

A number of embodiments of the invention have been described. Nevertheless, it will be understood that various modifications may be made without departing from the spirit and scope of the invention. Accordingly, other embodiments are within the scope of the following claims.

What is claimed is:

1. A chromatographic method for separating macromolecules in a mixture which undergo a temperature sensitive structural denaturation, comprising the steps of: applying a mixture containing said macromolecules onto a stationary reverse phase support under conditions which do not substantially denature said macromolecules; eluting said macromolecules with a mobile phase while exposing said macromolecules to a temperature gradient effective to at least partially denature said macromolecules, which results in the separation of said macromolecules.

2. A chromatographic method for separating macromolecules in a mixture which undergo a temperature sensitive structural denaturation, comprising the steps of: applying a mixture containing said macromolecules to a stationary reverse phase support under conditions which at least partially denature said macromolecules; eluting said macromolecules with a mobile phase while exposing said macromolecules to a temperature gradient, which results in the separation of said macromolecules.

3. A method according to claim 1 or 2 wherein said mobile phase is applied to said support at a constant composition while eluting.

4. A method according to claim 1 or 2 wherein said temperature gradient comprises a range of less than about 20° C.

5. A method according to claim 4 wherein said stationary support is selected from the group consisting of hydrophobic derivatives of silica, alumina, and zirconia, and polystyrene, polyacrylamide, styrene-divinyl benzene copolymers, polymethacrylates, and methacrylate copolymers.

6. A method according to claim 4 wherein said mobile phase comprises a polar organic solvent and an ion-pairing agent.

7. A method according to claim 1 wherein said temperature gradient is achieved by heating said stationary support.

8. A method according to claim 2 wherein said mixture is applied to said support at a temperature sufficient to at least partially denature said macromolecules and said temperature gradient is achieved as said mixture cools during elution.

9. A method according to claim 1 or 2 wherein said macromolecules comprise polynucleic acids.

10. A method according to claim 9 wherein said polynucleic acids comprise duplex DNA molecules.

11. A method according to claim 10 wherein said duplex DNA molecules comprise heteroduplex DNA molecules.

12. A method according to claim 6 wherein said ion-pairing agent is selected from a group consisting of amines, trialkyl ammonium salts and quaternary ammonium salts.

13. A method according to claim 6 wherein said mobile phase contains an organic solvent selected from the group consisting of methanol, ethanol, acetonitrile and 2-propanol.

14. A method according to claim 4 wherein said temperature gradient is from about 45° to about 60° C.

* * * * *